United States Patent [19]

Kobayashi

[11] Patent Number: 4,751,689

[45] Date of Patent: Jun. 14, 1988

[54] METHOD OF MEASURING A DISTANCE

[75] Inventor: Hiroshi Kobayashi, Tokyo, Japan

[73] Assignee: Nihon Coating Co., Ltd., Tokyo, Japan

[21] Appl. No.: 853,884

[22] Filed: Apr. 21, 1986

[30] Foreign Application Priority Data

Jul. 22, 1985 [JP] Japan .................... 60-161488

[51] Int. Cl.⁴ .............................. G01S 3/80
[52] U.S. Cl. .................... 367/127; 367/128; 367/2
[58] Field of Search .................. 367/127, 128, 2

[56] References Cited

U.S. PATENT DOCUMENTS

| 3,949,605 | 4/1976 | Stallworth et al. | 367/128 |
| 4,136,394 | 1/1979 | Jones et al. | 367/128 |
| 4,399,556 | 8/1983 | Whidden | 367/128 |

FOREIGN PATENT DOCUMENTS

| 53-2688 | 1/1978 | Japan . | |
| 58-27706 | 2/1983 | Japan . | |
| 58-92877 | 6/1983 | Japan | 367/128 |
| 58-39306 | 8/1983 | Japan . | |
| 58-139170 | 9/1983 | Japan . | |
| 59-133271 | 9/1984 | Japan . | |

Primary Examiner—Theodore M. Blum
Attorney, Agent, or Firm—Sandler & Greenblum

[57] ABSTRACT

Disclosed is a method for measuring a distance by using a radio-wave and an ultra-sonic wave. The method includes the steps of generating a certain start pulse in the form of a radio-wave between a measuring position and a position to be measured from the measuring position, receiving the radio-wave at the position to be measured while simultaneously generating an ultra-sonic wave from the same measuring position, determining a time difference between the moment of generating the start pulse and the moment of receiving the ultra-sonic wave, and multiplying the obtained difference by the sonic velocity.

The method of measuring distances by utilizing the radio-wave and the ultra-sonic waves is very accurate without false operation and is simple, brief and convenient to use.

11 Claims, 3 Drawing Sheets

METHOD OF MEASURING A DISTANCE

FIELD OF THE INVENTION

This invention relates to a convenient instantaneous method for measuring a distance, for example, in order to determine an accurate distance from any starting point to a pin on the green in a golf course.

BACKGROUND OF THE INVENTION

During playing gold there are many occasions where a golf player wants to know a distance from a starting point to a pin in the hole on a target green.

For this purpose, various optical and acoustic devices of simple construction have hitherto been commercially available for measuring a distance (for example, Japanese U.M. Publication No. 2688/78, Japanese Opened U.M. Application Nos. 27706/83, 139170/83, 133271/84, and Japanese Patent Publication No. 39306/83).

In a conventional method for measuring a distance with such known devices, points A and B for measuring an angle are established in such a way that they are spaced apart by a distance L from each other for locating a measuring point M therebetween, as shown in FIG. 4, in order to actually measure the angle formed between the lines A-M and A-P, wherein P represents a point to be measured, as well as an angle formed between the lines B-M and B-P, thereby to make an equal angle $\theta$. Thus, a distance X from the measuring point M to the point P to be measured may be calculatd from the following equation:

$$X = L \tan \theta$$

Such procedure has also being utilized in a system for a camera view-finder to align a vertically separated image to the center, thereby bringing focus into the distance.

In such a case, however, a large proportion of the distance 2L between the points A and B relative to the distance X makes an angle $\theta$ of approximately 90 degrees, so that the value of tan $\theta$ approaches to infinity, thus, introducing a large error in the measured distance X.

For this reason, when measuring a distance even on a golf course of a usual distance shorter than 300 m, a distance 2L of 20 to 30 cm is required to bring the measured error less than 1%. As a result, a 20–30 centimeters long element for establishing the angle-measuring points A and B is required, which is inconvenient to carry during playing golf and hence has not been a popular commercial product.

Accordingly, an object of the invention is to solve the above problems and to provide a method for measuring an accurate distance instantaneously and conveniently by means of a compact device using a quite different system from the conventional methods.

SUMMARY OF THE INVENTION

In order to achieve the above object, one aspect for the invention provides a method of measuring a distance, which comprises the steps of:

generating a certain start pulse in the form of a radio-wave between a measuring position and a position to be measured from the measuring position, receiving the radio-wave at the position to be measured while simultaneously generating an ultra-sonic wave from the same measuring position, determining a time difference between the moment of generating said start pulse and the moment of receiving said ultra-sonic wave, and multiplying the obtained different by the sonic velocity.

In another aspect of the invention, there is provided a method for measuring a distance, which comprises the steps of:

generating a single pulse for each predetermined interval in the form of a radio-wave between a measuring position and a position to be measured from the latter position while simultaneously generating an ultra-sonic wave as a pulse at an equal interval from the same position based on the single pulse, determining a time difference in the single pulse between the radio-wave and the ultra-sonic wave arrived at the measuring position, and multiplying the obtained difference by the sonic velocity.

BRIEF DESCRIPTION OF THE DRAWINGS

The invention will now be illustrated for its embodiments hereinbelow in more detail with reference to the accompanying drawings, in which.

PREFERRED EMBODIMENTS OF THE INVENTION

The method of measuring a distance according to the invention is not based upon the conventional principle of optically measuring an angle but rather on measuring a time difference between a radio-wave and a sonic-wave from a measuring point to a point to be measured followed by multiplication of the time difference with the sonic velocity.

Figure 1:
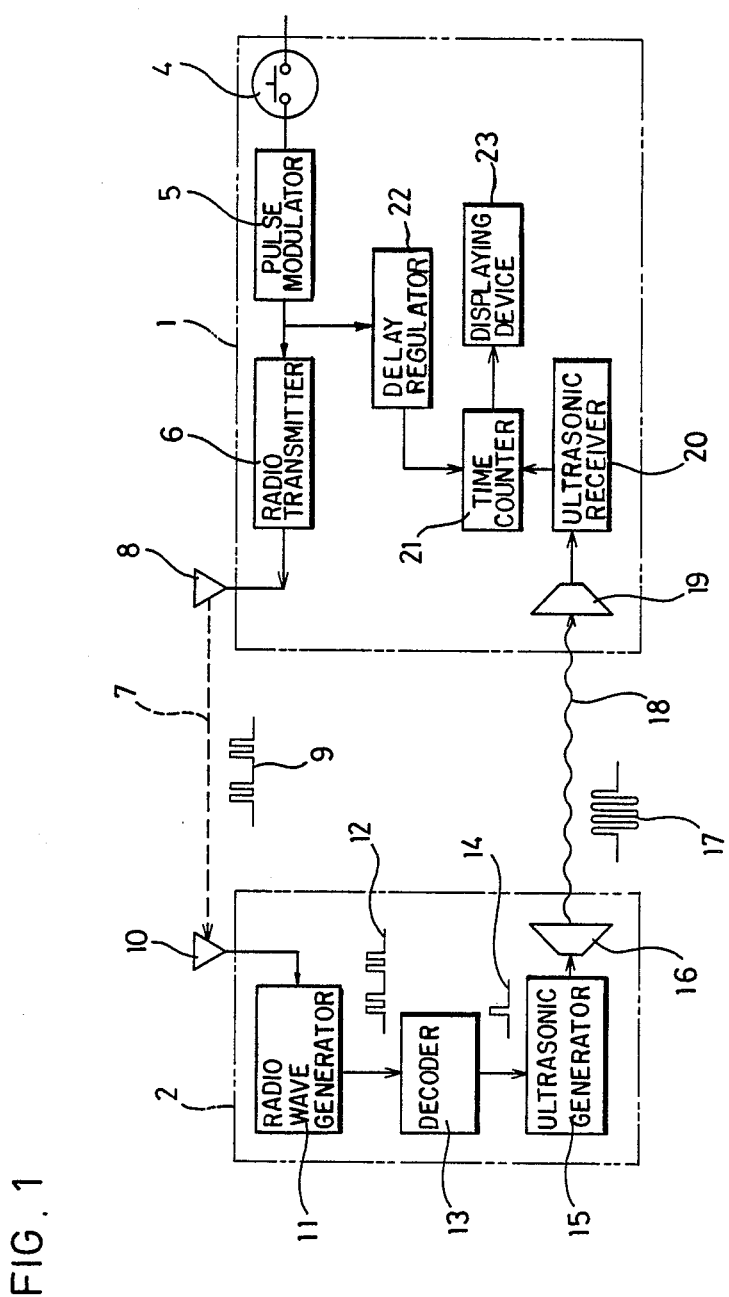
FIG. 1 is a schematic illustration of a first embodiment of the invention.

In a first embodiment, as illustrated in FIG. 1, the system comprises a distance-measuring device 1 carried by a golf player standing on the measuring side, and another distance-measuring device 2 incorporated in a pin 3 on the green on the side to be measured.

When the player wants to measure the distance to the pin 3, the device 1 is directed to the pin 3 and then, its start switch 4 is operated. Thus, an array of pulse signals as starting pulses is generated from a start pulse modulator 5 corresponding to a single or designated hole number. The signal array is sent through a radio-transmitter 6, from an antenna 8 as a pulse wave 7, in the form of a single or a plurality of waves 9 on a high frequency carrier.

On the opposite side, the measuring device 2 incorporated in the pin 3, receives by an antenna 10 the pulse wave 7 transmitted from the antenna 8. The received pulse wave 7 is amplified by a radio-wave generator 11, detected, extracted as a pulse signal in the form of a wave 12 and sent to a decoder 13. The pulse signal sent to the decoder 13 is decoded and is fed into an ultra-sonic generator 15 as a pulse in the form of a wave 14 when the signal corresponds to the target hole number. The ultra-sonic generator 15 generates an electric signal modulated by the input pulse, thereby to energizing an ultra-sonic oscillator 16 for transmitting an ultra-sonic wave 18 in the from of a wave 16 form the pin 3.

The ultra-sonic wave 18 is transmitted at the sonic velocity and is received by an ultra-sonic detector 19 of a receiving sensor in the distance-measuring device 1 carried by the player after the time which is calculated by dividing a distance from the pin 3 to the player by the sonic velocity. The ultra-sonic wave 18 received in the detector 19 is then modulated in a high frequency to generate an electric pulse signal, whichis then amplified and detected by an ultra-sonic receiver 20 to be fed into a time-counter 21, as described hereinafter.

The time-counter 21 is contained in the distance-measuring device 1 and is provided with a clock-pulse generator therein. As described above, the pulse array generated from the start-pulse modulator 5 by operating the starting switch 4 is sent to the transmitter 6 and at the same time is fed into the time-counter 21 through a delay regulator 22. At this point in time, the clock-pulse generator starts measuring the time. On the other hand, the input of the electric pulse signal(which has been amplified and detected by the ultra-sonic reciever 20) into the time-counter discontinues the time measurement by the clock-pulse generator.

In other words, the time-counter may measure a length of time from the point when the pulse array generated by the distance-measuring device 1 is transmitted in the form a pulse-like radio-wave 7 to the point when the ultra-sonic wave 18 generated by the distance-measuring device 2 is received by the distance-measuring device 1 and fed into the time-counter 21 as the electric pulse signal. This means that if a time delay from the point of generating the pulse array in the measuring device 1 to the point of generating the ultra-sonic wave 18 in the measuring device 2 is adjusted by the delay regulator 22 in order to delay the starting time of the time-counter 21, the length of time measured by the latter represents a transmitting time of the ultra-sonic wave 18 from the device 2 to the device 1. Thus, multiplication of the measured length of time by the sonic velocity may readily provide a distance from the device 1 to the device 2, namely from the player to the pin 3. Such calculation may conveniently be conducted by a simple calculation circuit, which may display the result on a displaying device 23 to be observed conveniently by the player.

In this case, the time consumed for transmitting the pulse signal from the point of generating the pulse array to the point of generating the ultra-sonic wave 18 is very short due to the velocity of electric current, so the delay regulator 22 may be omitted for inputting the pulse array directly into the time-counter 21 with only a negligible error.

Further, the ultra-sonic wave 18 is transmitted with a sharp precision, so that detection of erroneous ultra-sonic waves from other pins may be avoided. In addition, an arriving distance of the radio-wave is short so that the decoder 13 may sometimes be omitted which is designed for responding only to a radio-wave from a specified pin 3. In such a case, the pulse signal transmitted as the radio-wave may be of a single pulse. When the specified pin 3 is located in the vicinity of other pins due to the arrangement in golf courses, however, the number of a target pin should be preset prior to operating of the starting switch 4 in the measuring device 1 for sending the corresponding signal pulse array from the modulator 5 in order to avoid false operation.

Figure 2:
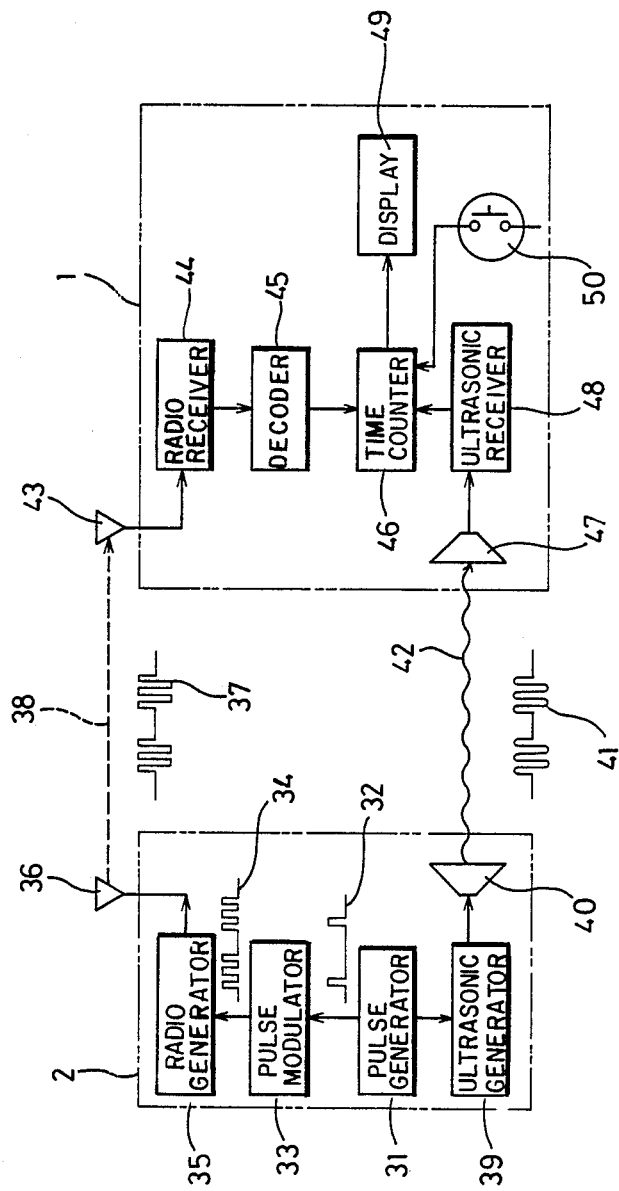
FIG. 2 is a schematic illustration of a second embodiment of the invention.
Figure 4:
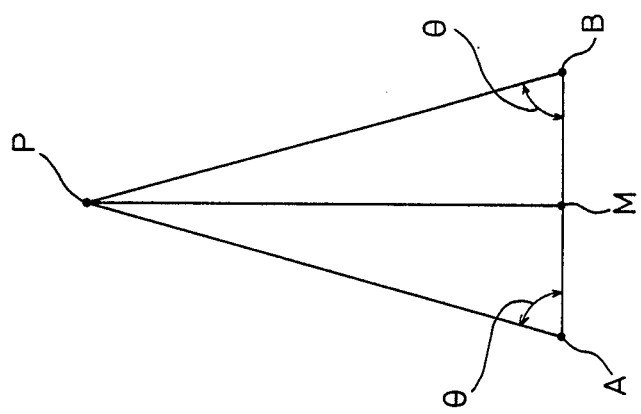
FIG. 4 is a schematic illustration of showing the conventional method of measuring the distance.

In accordance with the second embodiment, as shown in FIG. 2, the distance-measuring device 2 is provided with a pulse-generator 31 which generates a single pulse for each predetermined time interval (for example, one second), which pulse may be in the form of a specified code-pulse, such as a wave-form 32, corresponding to a target hole.

In this case, the code-pulse may be used for modulating a high frequency carrier to the wave 32 by means of a pulse modulator 33 and sent to a radio-generator 35 for transmitting a pulse-like modulated wave (such as a wave 37), into the surroundings as a radio-wave 38 from a transmitting antenna 36. The pulse generator 31 may provide the code-pulse for an ultra-sonic generator 39 in the same way as described above while the corresponding high frequency carrier is outputted in the form of a pulse and sent to an ultra-sonic oscillator 40, thereby transmitting an ultra-sonic wave 42 (such as a wave 41) into the surroundings.

On the other hand, the distance-measuring device 1 may receive the radio-wave 38 from the measuring device 2. The radio-wave 38 is then detected and amplified by a radio-receiver 44 to form a voltage-pulse array which is decoded through a decoder 45 to be confirmed as a signal from the specified pin 3 and to generate a starting pulse. Thereafter, the starting pulse is inputted into a time-counter 46 for starting the measurement of time in a clock-pulse generator.

The ultra-sonic wave 42 from the ultra-sonic oscillator 40 of the measuring device 2 is inputted into an ultra-sonic detector 47 and then, modulated in the high frequency to generate an electric pulse signal which in turn is amplified and detected by an ultra-sonic receiver 48 and inputted into the time-counter 46 thereby to discontinuing the measuring of time in the clock-pulse generator.

In order to add the pulse from the pulse-generator 31, both to the pulse-modulator 33 and to the ultra-sonic generator 39, the radio-wave 38 and the ultra-sonic wave 42 may be considered to be generated simultaneously from the measuring device 2. Since the transmitting velocity of the radio-wave 38 is greater (by approximately $10^6$) than that of the ultra-sonic wave 42, a large deviation of time might occur between the two waves required to reach from the device 2 to the device 1. Thus, the radio-wave 38 and the ultra-sonic wave 42 received by the device 1 are deviated in phase per pulse from each other. However, the distance between the devices 1 and 2 is at most 300 m, the time required for the radio-wave 38 to reach from the device 2 to device 1 is approximates zero, thus so that the time of phase deviation may be considered equal to the time required for the ultra-sonic way 42 to reach from the device 2 to the device 1. For this reason, the distance between the two measuring-devices 1 and 2 may be readily determinedby multiplying the time of phase deviation by the sonic velocity. Thus, the player can conveniently know the distance shown on the display 49.

In operation, the ultra-sonic detector 47 is, at first, directed to the pin 3 on the target hole while the reset switch 50 is operated for clearing the time-counter 46 and the display 49. Then, the radio-wave 38 and the ultra-sonic wave 42 are received from the distance-measuring device 2 for measuring the phase deviation by the time-counter 46, which is then multiplied by the sonic velocity to give the distance on the display 49.

Thus, the distance between the player and the pin 3 may readily be known.

Figure 3:
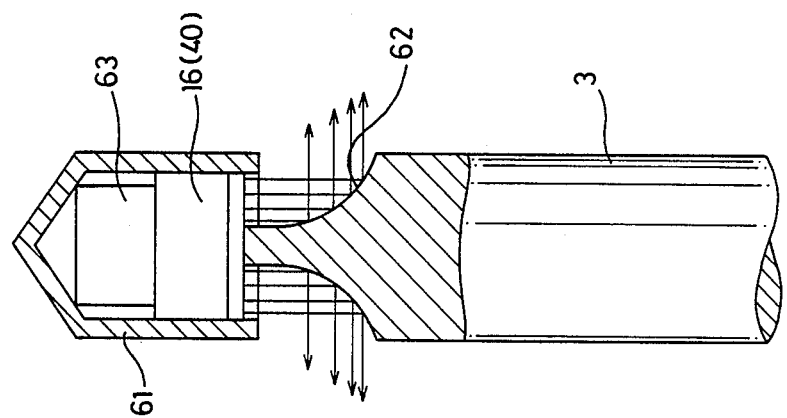
FIG. 3 is a schematic illustration of a device for measuring a distance, which is incorporated into a pin on a green.

As described hereinabove, the distance-measuring device 2 is incorporated into the pin 3, more particularly at its top end 61, as shown in FIG. 3. A tapered reflector 62 is affixed the area containing the device 2, while the ultra-sonic generator 16(40) is directed downwardly in the device 2, and other elements 63, such as the power source, may be arranged above the ultra-sonic generator 16(40). Thus, the ultra-sonic wave generated downwardly is reflected horizontally by the reflector 62 and transmitted to the surroundings.

Each of the elements utilized in the distance-measuring devices 1 and 2 may be are commercially available in a very compact size due the rapid advances in the electronic technology, so that the device 2 may readily be incorporated into the top end 61 of the pin 3 while the device 1 may conveniently be placed in the palms of a player.

Of course, the above described method of measuring a distance according to the invention may be applied not only to golf but to other occasions for measuring a distance, such as a distance between vehicles.

In accordance with the invention, as described hereinabove, a distance may very briefly and simply be measured in a very short time only by generating a certain start pulse in the form of a radio wave between a measuring position and a position to be measured from the measuring position, receiving the radio wave at the position to be measured while simultaneously generating an ultra-sonic wave from the same measuring position, determining a time difference between the moment of generating the start pulse and the moment of receiving the ultra-sonic wave, and multiplying the obtained difference by the sonic velocity. Further, the measurement calculated by utilizing the radio-wave and the ultra-sonic wave is very accurate without any likelihood of a false operation. Furthermore, the device may be constructed, as illustrated in the embodiments above, in a very compact form. The method according to the invention may be applied not only to a short distance but also to a rather long distance with small error.

In the other embodiment of an invention, the method may comprise the steps of generating a single pulse for each predetermined interval in the form of a radio-wave between a measuring position and a position to be measured from the latter position while simultaneously generating an ultra-sonic wave as a pulse at the equal interval from the same position based on the single pulse, measuring a time difference in the single pulse between the radio-wave and the ultra-sonic wave arrived at the measuring position, and multiplying the obtained difference by the sonic velocity. This embodiment has a further advantage in that only the reset switch 50 may be operated on the operator side but other procedures (such as generation of the radio-wave and the ultra-sonic wave) may occur spontaneously on the side to be measured, so that the operation is very simple, brief and convenient to use at any time and on any occasion.

Although the invention has been described hereinabove with its preferred embodiments, such as application to the golf course, it will be appreciated to those skilled in the art that many variations and modifications may be made while keeping several advantages as shown hereinabove and without departing from the scope and spirit of the invention.

What is claimed is:

1. A method of measuring a distance, comprising the steps of:
    generating at least one starting pulse in the form of a radio-wave between a reference position and a position to be measured from said reference position;
    receiving said radio-wave at said position to be measured while simultaneously generating an ultra-sonic wave from said position to be measured, wherein a generally vertically upstanding pin is located at said position to be measured, said pin having an elongated bodyportion and a top end, said top end comprising an ultrasonic generator adapted to generate ultra-sonic waves downwardly, said pin further comprising a tapered reflector located directly below at least a portion of said ultra-sonic generator and comprising means for reflecting said ultra-sonic waves generated by said generator horizontally;
    determining a time difference between the moment of generating said starting pulse and another moment when said ultra-sonic wave is received; and
    multiplying said time difference by the velocity of sound in air.

2. A method of measuring a distance with respect to a reference position comprising the steps of:
    simultaneously generating, from a position to be measured, a single pulse for a predetermined interval in the form of a radio-wave, said single pulse being generated towards a reference position, and an ultra-sonic wave in the form of a pulse at an interval equal to said predetermined interval;
    determining the difference in time taken by the radio-wave and the ultra-sonic wave to reach said reference position; and
    multiplying said time difference by the velocity of sound in air.

3. The method of measuring a distance as claimed in claim 1, wherein one of said starting pulses comprises a single pulse.

4. The method of measuring a distance as claimed in claim 1, wherein one of said starting pulses comprises a plurality of pulses.

5. A method of measuring a distance, comprising the steps of:
    generating at least one starting pulse in the form of a radio-wave from a reference position so that each said starting pulse will travel between said reference position and a position to be measured;
    inputting said starting pulse into a time-counter thereby starting measurement of a time period;
    receiving said radio-wave at said position to be measured and simultaneously generating an ultra-sonic wave from said position to be measured, wherein a substantially vertical pin having a body portion and a top end is located at said position to be measured, said top end comprising an ultra-sonic wave generator for generating said ultra-sonic wave in a substantially downwardly vertical direction, said pin further comprising at least one tapered reflector located directly below at least a portion of said ultra-sonic generator, said tapered reflector comprising means for reflecting said downwardly generated ultra-sonic wave so that said wave will travel in a substantially horizontal path;
    receiving said ultra-sonic wave at said reference position and inputting said ultra-sonic wave into said time-counter as an electric pulse signal thereby stopping measurement of said time period;

determining the time delay between the moment at which said starting pulse is generated from said reference position and the moment that said ultra-sonic wave is generated from said pin and said position to be measured;

determining the time difference between the moment of generating said starting pulse and the moment that said ultra-sonic wave is received;

adjusting said time difference with said time delay; and multiplying said adjusted time difference by the velocity of sound in air.

6. The method of measuring a distance as claimed in claim 5, wherein one of said starting pulses comprises a single pulse.

7. The method of measuring a distance as claimed in claim 5, wherein one of said starting pulses comprises a plurality of pulses.

8. An apparatus for measuring a distance comprising:
a. first distance-measuring device to be carried by an operator and a second distance-measuring device positioned at a target location from which the distance is being measured;

said first distance-measuring device comprising a start pulse modulator, a radio transmitter for sending pulse-signals corresponding to a predetermined location number, and an antenna;

said second distance-measuring device comprising a receiving antenna, a radio-wave generator comprising means for amplifying each of said pulse-signals, and a decoder, said decoder comprising means for decoding each of said pulse-signals and for feeding said decoded pulse-signals into an ultrasonic generator device as pulses in the form of a wave, wherein each of said pulse-signals corresponds to said predetermined location number; and said ultra-sonic generator is located in a substantially vertical pin having a body portion and a top end, said ultra-sonic generator being positioned in the top end of said pin, said body portion of said pin further comprising a tapered reflector positioned directly below at least a portion of said ultra-sonic generator, said ultra-sonic generator comprising means for emitting ultra-sonic waves in a substantially downwardly vertical revertical direction, said tapered reflector comprising means for reflecting said ultra-sonic waves away from second distance-measuring device in a substantially horizontal fashion towards said first distance-measuring device, said ultra-sonic generator further comprises means for generating an electric signal modulated by said decoded pulse signals and for energizing an ultra-sonic oscillator located in said second distance-measuring device, said ultra-sonic oscillator further comprising means for generating said ultra-sonic waves, said first distance-measuring device further comprising means for receiving said ultra-sonic waves and means for determining the time elapsed between a time when one of sai dpulse-signals is sent by said first distance-measuring device and a time when a corresponding ultra-sonic wave is received by said first distance-measuring device.

9. The apparatus for measuring a distance as claimed in claim 8, further comprising an ultra-sonic detector, said ultrasonic detector comprising means for receiving, modulating and generating an electric pulse signal, an ultra-sonic receiver for amplifying, detecting, and feeding said electric pulse signal into a time-counter;

said ultra-sonic detector, said ultra-sonic receiver, and said time-counter being located in said first distance-measuring device.

10. The apparatus for measuring a distance as claimed in claim 9, further comprising a delay regulator for adjusting a time delay in starting said time-counter, and a display device for displaying the calculated distance, said delay regulator and said display device being located in said first distance-measuring device.

11. The apparatus of claim 8, wherein said tapered reflector is arcuate.

* * * * *

UNITED STATES PATENT AND TRADEMARK OFFICE
CERTIFICATE OF CORRECTION

PATENT NO. : 4,751,689

DATED : June 14, 1988

INVENTOR(S) : Hiroshi KOBAYASHI

It is certified that error appears in the above-identified patent and that said Letters Patent is hereby corrected as shown below:

```
At column 1, line 12, change "gold" to ---golf---.
At column 1, line 25, change "L" to ---2L---.
At column 1, line 37, change "being" to ---been---.
At column 1, line 44, delete "to" before "infinity".
At column 1, line 51, insert ---to--- after "error".
At column 1, line 56, change "an" to ---the---.
At column 1, line 63, change "for" to ---of---.
At column 1, line 63, change "object" to ---objective---.
At column 2, line 45, change "with" to ---by---.
At column 2, line 53, change "and then," to ---, and then---.
At column 2, line 54, insert ---,--- after "signals".
At column 2, line 55, insert ---,--- after "pulses".
At column 2, line 61, insert ---,--- after "2".
At column 3, line 5, change "from" to ---form---.
At column 3, line 5, change "form" to ---from---.
At column 3, line 5, change "16" to ---17---.
At column 3, line 13, change "whichis" to ---which is---.
At column 3, line 47, delete "," after "circuit".
At column 3, line 68, delete "of" before "the".
```

UNITED STATES PATENT AND TRADEMARK OFFICE
CERTIFICATE OF CORRECTION

PATENT NO. : 4,751,689

DATED : June 14, 1988

INVENTOR(S) : Hiroshi KOBAYASHI

It is certified that error appears in the above-identified patent and that said Letters Patent is hereby corrected as shown below:

At column 4, line 7, change ",which" to ---; each---.
At column 4, line 14, delete "," before "into".
At column 4, line 36, delete "to" after "thereby".
At column 4, line 39, delete "," after "31".
At column 4, line 40, change "both to" to ---to both---.
At column 4, line 40, delete "to" after "and".
At column 4, line 51, insert ---and--- before "the".
At column 4, line 53, change "approximates" to ---approximately---.
At column 4, line 53, change ",thus so that" to ---; therefore,---.
At column 4, line 55, change "way" to ---wave---.
At column 4, line 58, change "minedby" to ---mined by---.
At column 5, line 14, delete "may be".
At column 5, line 15, insert ---to--- after "due".
At column 5, line 40, insert ---,--- after "method".
At column 5, line 41, insert ---,--- after "invention".
At column 5, line 63, change "to" to ---by--- before "those".

UNITED STATES PATENT AND TRADEMARK OFFICE
CERTIFICATE OF CORRECTION

PATENT NO. : 4,751,689

DATED : June 14, 1988

INVENTOR(S) : Hiroshi KOBAYASHI

It is certified that error appears in the above-identified patent and that said Letters Patent is hereby corrected as shown below:

At column 6, line 12 (in claim 1, line 12), change "bodyportion" to ---body portion---.

At column 6, line 31 (in claim 2, line 6), delete "," after "position".

At column 6, line 39 (in claim 3, line 1), insert ---,--- after "distance".

At column 6, line 42 (in claim 4, line 1), insert ---,--- after "distance".

At column 7, line 15 (in claim 6, line 1), insert ---,--- after "distance".

At column 7, line 18 (in claim 7, line 1), insert ---,--- after "distance".

At column 7, line 22 (in claim 8, line 2), change "a. first" to ---a first---.

At column 8, line 6 (in claim 8, line 27), delete "revertical".

At column 8, line 20 (in claim 8, line 4), change "sai dpulse" to ---said pulse---.

At column 8, line 24 (in claim 9, line 1), insert ---,--- after "distance".

UNITED STATES PATENT AND TRADEMARK OFFICE
CERTIFICATE OF CORRECTION

PATENT NO. : 4,751,689

DATED : June 14, 1988

INVENTOR(S) : Hiroshi KOBAYASHI

It is certified that error appears in the above-identified patent and that said Letters Patent is hereby corrected as shown below:

At column 8, line 33 (in claim 10, line 1), insert ---,--- after "distance".

Signed and Sealed this

Twenty-first Day of August, 1990

Attest:

HARRY F. MANBECK, JR.

*Attesting Officer*  *Commissioner of Patents and Trademarks*